US011827567B2

(12) United States Patent
LaCourse

(10) Patent No.: US 11,827,567 B2
(45) Date of Patent: *Nov. 28, 2023

(54) MATERIAL INCLUDING BORON SUBOXIDE AND METHOD OF FORMING SAME

(71) Applicant: SAINT-GOBAIN CERAMICS & PLASTICS, INC., Worcester, MA (US)

(72) Inventor: Brian C. LaCourse, Pepperell, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/351,777

(22) Filed: Jun. 18, 2021

(65) Prior Publication Data

US 2022/0009836 A1 Jan. 13, 2022

Related U.S. Application Data

(62) Division of application No. 16/396,582, filed on Apr. 26, 2019, now Pat. No. 11,066,331.

(60) Provisional application No. 62/663,933, filed on Apr. 27, 2018.

(51) Int. Cl.
*C04B 35/01* (2006.01)
*C04B 35/626* (2006.01)
*C04B 35/645* (2006.01)

(52) U.S. Cl.
CPC .......... *C04B 35/01* (2013.01); *C04B 35/6261* (2013.01); *C04B 35/645* (2013.01); *C04B 2235/3409* (2013.01); *C04B 2235/5436* (2013.01); *C04B 2235/6562* (2013.01); *C04B 2235/6567* (2013.01); *C04B 2235/761* (2013.01); *C04B 2235/96* (2013.01)

(58) Field of Classification Search
CPC ...................................................... C04B 35/01
See application file for complete search history.

(56) References Cited

U.S. PATENT DOCUMENTS

| | | | |
|---|---|---|---|
| 1,105,388 A | 7/1914 | Weintraub | |
| 3,186,586 A | 6/1965 | Box | |
| 3,660,031 A | 5/1972 | Holcombe, Jr. et al. | |
| 3,816,586 A | 6/1974 | Goosey et al. | |
| 5,135,892 A | 8/1992 | Ellison-Hayashi et al. | |
| 5,330,937 A | 7/1994 | Ellison-Hayashi et al. | |
| 5,366,526 A | 11/1994 | Ellison-Hayashi et al. | |
| 5,456,735 A | 10/1995 | Ellison-Hayashi et al. | |
| 6,982,125 B2 | 1/2006 | Lacourse et al. | |
| 7,247,577 B2 | 7/2007 | Palmgren et al. | |
| 7,369,393 B2 | 5/2008 | Zandi et al. | |
| 7,531,109 B2 | 5/2009 | LaCourse et al. | |
| 7,840,305 B2 | 11/2010 | Behr et al. | |
| 8,155,496 B1 | 4/2012 | Cumberland et al. | |
| 8,197,780 B2 | 6/2012 | Davies et al. | |
| 8,206,473 B2 | 6/2012 | Huzinec et al. | |
| 8,426,043 B2 | 4/2013 | Andrews et al. | |
| 8,426,330 B2 | 4/2013 | Andrews et al. | |
| 8,460,578 B2 | 6/2013 | LaCourse et al. | |
| 8,877,093 B2 | 11/2014 | LaCourse et al. | |
| 9,175,216 B2 | 11/2015 | LaCourse et al. | |
| 9,183,962 B2 | 11/2015 | LaCourse et al. | |
| 10,189,746 B2 | 1/2019 | Tierney et al. | |
| 2010/0304138 A1 | 12/2010 | Andrews et al. | |
| 2012/0217436 A1 | 8/2012 | Bales et al. | |
| 2014/0091227 A1 | 4/2014 | Yang et al. | |
| 2014/0227158 A1 | 8/2014 | Pavlacka et al. | |
| 2016/0130184 A1 | 5/2016 | Lin et al. | |
| 2017/0241747 A1 | 8/2017 | Ganor et al. | |

FOREIGN PATENT DOCUMENTS

| | | |
|---|---|---|
| GB | 191107103 | 7/1911 |
| JP | 2004075467 A | 3/2004 |
| WO | 2008132675 A2 | 11/2008 |
| WO | 2016094440 A1 | 6/2016 |
| WO | 2017112677 A1 | 6/2017 |

OTHER PUBLICATIONS

Coleman, Shawn P. et al. "Challenges of Engineering Grain Boundaries in Boron-Based Armor Ceramics," The Minerals, Metals & Materials Society, vol. 68, No. 6, 2016, pp. 1605-1615.

He, Duanwei et al. "Boron suboxide: As hard as cubic boron nitride," Applied Physics Letters, vol. 81, No. 4, Jul. 2002, pp. 643-645.

Petrak, D. R.; Ruh, Robert and Goosey, B.F., Preparation and Characterization of Boron Suboxide, National Bureau of Standards Publication 364, Solid State Chemistry, Proceedings of 5th Materials Research Symposium, Jul. 1972, pp. 605-611, Ohio.

Akashi Takaya; Itoh, Tsuyoshi; Gunjishima, Itaru; Masumoto, Hiroshi and Goto, Takashi, Thermoelectric Properties of Hot-pressed Boron Suboxide (B6O), Materials Transactions, 2002, pp. 1719-1723, vol. 43, The Japan Institute of Metals, Institute for Materials Research, Tohoku University, Sendai, Japan.

Rizzo, H.F.; Simmons, W. C. and Bielstein, H. O., The Existence and Formation of the Solid B6O, Journal of the Electrochemical Society, Nov. 1962, pp. 1079-1082, vol. 109, No. 11, Aeronautical Research Laboratories, Office of Aerospace Research, United States Air Force, Wright-Patterson Air Force Base, Ohio.

Petrak, D. R.; Ruh, Robert and Atkins, G. R., Mechanical Properties of Hot-Pressed Boron Suboxide and Boron, 1974, pp. 569-573, vol. 53, No. 8, Air Force Materials Lab, Wright-Patterson AFB, Ohio.

(Continued)

*Primary Examiner* — Karl E Group
(74) *Attorney, Agent, or Firm* — Abel Schillinger, LLP; Adrian Lawrence

(57) ABSTRACT

A material including a body including $B_6O_X$ can include lattice constant c of at most 12.318. X can be at least 0.85 and at most 1. In a particular embodiment, $0.90 \leq X \leq 1$. In another particular embodiment, lattice constant a can be at least 5.383 and lattice constant c can be at most 12.318. In another particular embodiment, the body can consist essentially of $B_6O_X$.

19 Claims, 4 Drawing Sheets

(56) References Cited

OTHER PUBLICATIONS

Brodhag, C. and Thevenot, F., Journal of the Less-Common Metals, 1986, pp. 1-6, vol. 117, Elsevier Sequoia, The Netherlands.

Srikanth, Varanasi; Roy, Rustom, Graham, Earl K., Voigt, Donald E., BxO: Phases Present at High Pressure and Temperature, Journal of the American Ceramic Society, 1991, pp. 3145-3147, vol. 74 [12], Materials Research Laboratory, The Pennsylvania State University, University Park, Pennsylvania.

Hubert, Hervé; Garvie, Laurence A. J.; Devouard, Bertrand; Buseck, Peter R.; Petuskey, William R.; McMillan, Paul F., High-Pressure, High-Temperature Synthesis and Characterization of Boron Suboxide (B6O), Chemistry Materials, May 15, 1998, pp. 1530-1537, vol. 10 (6), American Chemical Society, Department of Chemistry & Biochemistry and Department of Geology, Arizona State University, Tempe, Arizona.

Rhodes, William H. et al., Research on Development and Fabrication of Boron Suboxide Specimens, Technical Report, National Technical Information Service, U.S. Department of Commerce, Aug. 1972, Avco Corporation, Ohio.

Ogunmuyiwa, Enoch N.; Johnson, Oluwagbenga T.; Sigalas, Iakovos; Hermann, Mathias; and Afolabi, Ayo S., Optimization of the Synthesis of Boron Suboxide Powders, Proceedings of the World Congress on Engineering and Computer Science, Oct. 2014, pp. 22-24, vol. 2, San Francisco, USA.

Dunn, Jennifer et al., Computational Materials Research: Boron Suboxide Ceramic Armor, S&T Campaign: Materials Research—Tier 2 High Strain Rate & Ballistic Materials, Ceramics & Transparent Materials Branch.

Grabis, J. et al., "Preparation of Boron Suboxide Nanoparticles and Their Processing," 5th Baltic Conference on Silicate Materials, IOP Conf. Series: Materials Science and Engineering 25, 2011, IOP Publishing, pp. 1-5.

Kurakevych, Oleksandr O. et al., "Experimental Study and Critical Review of Structural, Thermodynamic and Mechanical Properties of Superhard Refractory Boron Suboxide B6O," CMCP & IMPMC< Universite P&M Curie, LSPM-CNRS, University Paris Nord., date unknown, 13 pages.

Herrmann, M. et al., "Boron Suboxide Ultrahard Materials", International Journal of Refractory Metals & Hard Materials, 2013, vol. 39, pp. 53-60.

International Search Report & Written opinion for PCT/US2019/029500 dated Aug. 13, 2019, 12 pages.

Kobayashi, et al. "Structure of B6O boron suboxide by Rietveld refinement," J. of Mat. Sci. 28/(1993) 2129-2134 (Year: 1993).

MATERIAL INCLUDING BORON SUBOXIDE AND METHOD OF FORMING SAME

CROSS-REFERENCE TO RELATED APPLICATION(S)

This application is a divisional application of and claims priority under 35 U.S.C. § 120 to U.S. patent application Ser. No. 16/396,582, entitled "MATERIAL INCLUDING BORON SUBOXIDE AND METHOD OF FORMING SAME," by Brian C. LaCourse, filed Apr. 26, 2019, which claims priority under 35 U.S.C. § 119(e) to U.S. Provisional Application No. 62/663,933, entitled "MATERIAL INCLUDING BORON SUBOXIDE AND METHOD OF FORMING SAME," by Brian C. LaCourse, filed Apr. 27, 2018, all of which are assigned to the current assignee hereof and incorporated herein by reference in their entireties.

FIELD OF THE DISCLOSURE

The present invention is directed to a material including boron suboxide and methods of forming the same.

DESCRIPTION OF THE RELATED ART

Boron suboxide is a chemically inert, super hard material, with a relatively low mass density that can be used as an abrasive grit for polishing and grinding metals and in the formation of dense ceramic materials. Synthesizing boron suboxide to have the proper chemistry and properties is an extremely difficult task and has traditionally had limited success.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Embodiments are drawn to a process for forming a material including a body including a boron suboxide. As used herein, boron suboxide is intended to refer to $B_6O_X$. The process may facilitate the formation of $B_6O_X$ having improved features, including but not limited to, stoichiometry, purity, particular crystallographic features, hardness, ballistic capabilities, size and shape. For instance, in the context of the stoichiometry, "X" can be at least 0.85 and at most 1.1. In a particular embodiment, "X" can be at least 0.90.

Other embodiments are drawn to the material formed via the process including a body including $B_6O_X$. The body can include improved hardness, purity, density, volume, thickness, or any combination thereof. In some instances, the material can be suitable for forming an armor component.

Figure 1:
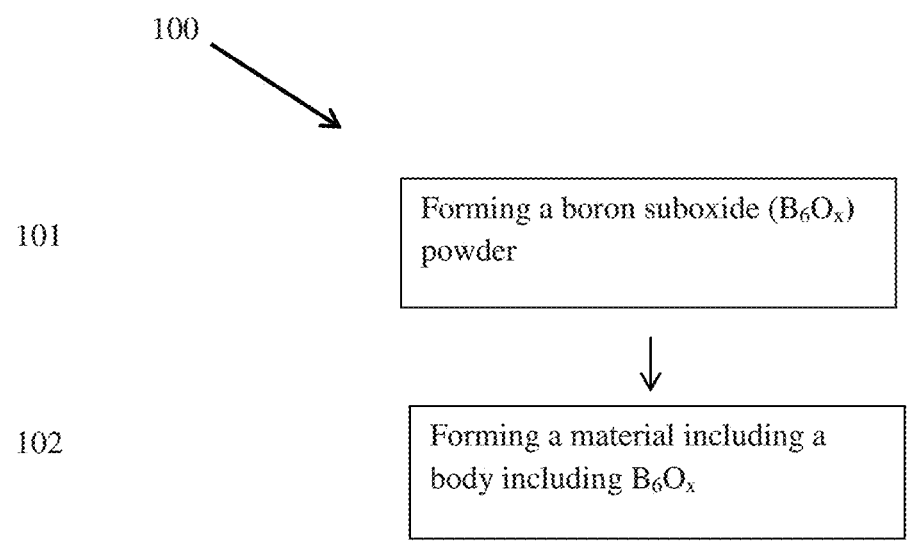
FIG. 1 includes a flowchart illustrating a process in accordance with an embodiment.

FIG. 1 includes a flowchart illustrating a process 100 for forming the material. At block 101, the process can start with forming $B_6O_X$ powder, which can include mixing raw materials including boron powder and boron oxide ($B_2O_3$) powder. In an embodiment, the boron powder can include amorphous boron and have a purity of at least 96% or at least 98%. In some instances, boron powder may include one or more impurities, which may be materials unintentionally included in the boron powder. An example of such an impurity may include a metal element, a metalloid element, a compound, or any combination thereof, and the total amount of the impurities can be at most 4 wt % or at most 3 wt % or at most 2 wt % of a total weight of the boron powder. The metal element can include an alkaline earth element, such as Mg. An exemplary metalloid element can include Si. In some instances, boron powder may include a trace amount of $B_2O_3$. In another embodiment, the $B_2O_3$ powder can include crystalline boric anhydride and have a purity of at least 99% or at least 99.5% or even at least 99.9%.

In an embodiment, the boron powder and $B_2O_3$ powder can be mixed at a particular ratio to facilitate formation of $B_6O_X$ powder. For instance, the mixing ratio of boron powder to $B_2O_3$ powder (by mass) can be at least 2.20, such as at least 2.30, at least 2.40, at least 2.45, at least 2.50, at least 2.60, or at least 2.70. In another instance, the mixing ratio of boron powder to $B_2O_3$ powder (by mass) can be at most 2.80, at most 2.70, at most 2.60, or at most 2.50. It is to be understood that the mixing ratio can be in a range including any of the minimum and maximum values noted herein. In a particular instance, the ratio of boron powder to $B_2O_3$ powder can be 2.48. In another particular instance, the ratio of boron powder to $B_2O_3$ powder (by mass) can be adjusted to 2.70 taking into consideration of some $B_2O_3$ contamination in the boron powder. In at least one embodiment, prior to mixing the boron and $B_2O_3$ powders, $B_2O_3$ powder may be subjected to a milling process to obtain a smaller average particle size (i.e., $d_{50}$). For example, $B_2O_3$ powder may be ball milled to have the average particle size of at most 150 microns, at most 140 microns, at most 135 microns, or even at most 125 microns. Smaller particle size may help to increase the surface area and reactivity of the $B_2O_3$ powder, which can allow a better reaction to occur between the boron and $B_2O_3$.

In an embodiment, mixing the raw materials can be performed to form a mixture having a homogenous dispersion of the components. In an aspect, a mixer can be used to facilitate mixing the raw materials, such as a planetary mixer, speed mixer, ultrasonic mixing, or an acoustic mixer. In particular instances, an acoustic mixer may be used. In another aspect, a grinding media, such as tungsten carbide or yttria-stabilized zirconia balls, may be added to the raw materials to facilitate formation of a homogenous mixture of the raw materials. A sieve may be used to separate the grinding media from the mixture after mixing is completed.

In an embodiment, forming the $B_6O_X$ powder can further include heating the mixture. Heating can be conducted in a furnace, and the mixture can be placed in a crucible. The crucible can include an inert material, such as boron nitride.

In an embodiment, heating can be conducted in an inert atmosphere, such as in an argon atmosphere. In another embodiment, heating can be conducted at a particular temperature that can facilitate formation of improved $B_6O_X$ powder. For example, the temperature can be at least 500° C., such as at least 600° C. In another instance, the temperature can be at most 1700° C., such as at most 1500° C. or at most 1400° C. Moreover, the heating temperature can be within a range including any of the minimum and maximum values noted herein, such as in a range from 600° C. to 1400° C.

In a particular exemplary implementation, heating can be conducted including a first heating temperature and a second heating temperature. For instance, the furnace temperature can be ramped up to a first temperature of at least 500° C. or at least 600° C., and at most 800° C., at which the mixture can be heated for a first period of time. In a further instance, the first period of time can be at least 15 minutes, at least 20 minutes, or at least 30 minutes. In another instance, the first period of time may be at most 60 minutes. The temperature of the furnace can then be increased to a second temperature. For example, the second temperature can be at least 1200° C. or at least 1300° C. or at least 1400° C. In another instance, the second temperature can be at most 1600° C. or at most 1500° C. or at most 1400° C. Moreover, the second temperature can be in a range including any of the minimum and maximum values noted herein. The mixture can be heated at the second temperature for a second period of time, such as at least 50 min and at most 80 min. In a further instance, the ramp rate can be at least 4° C./min and at most 25° C./min. The furnace can be allowed to cool down after heating is completed. $B_6O_X$ powder can be formed. In particular instances, pressure may not be needed during the heating process.

In one embodiment, the $B_6O_X$ powder can be milled and sieved to obtain a uniform average particle size, such as having a $d_{50}$ in a range from 0.1 microns to 1 micron. In another embodiment, the $B_6O_X$ powder can have a purity of at least 95%, such as at least 96% or at least 97% or at least 98%. In a particular embodiment, the $B_6O_X$ powder may not include an impurity that has not been present in the raw materials.

Figure 2:
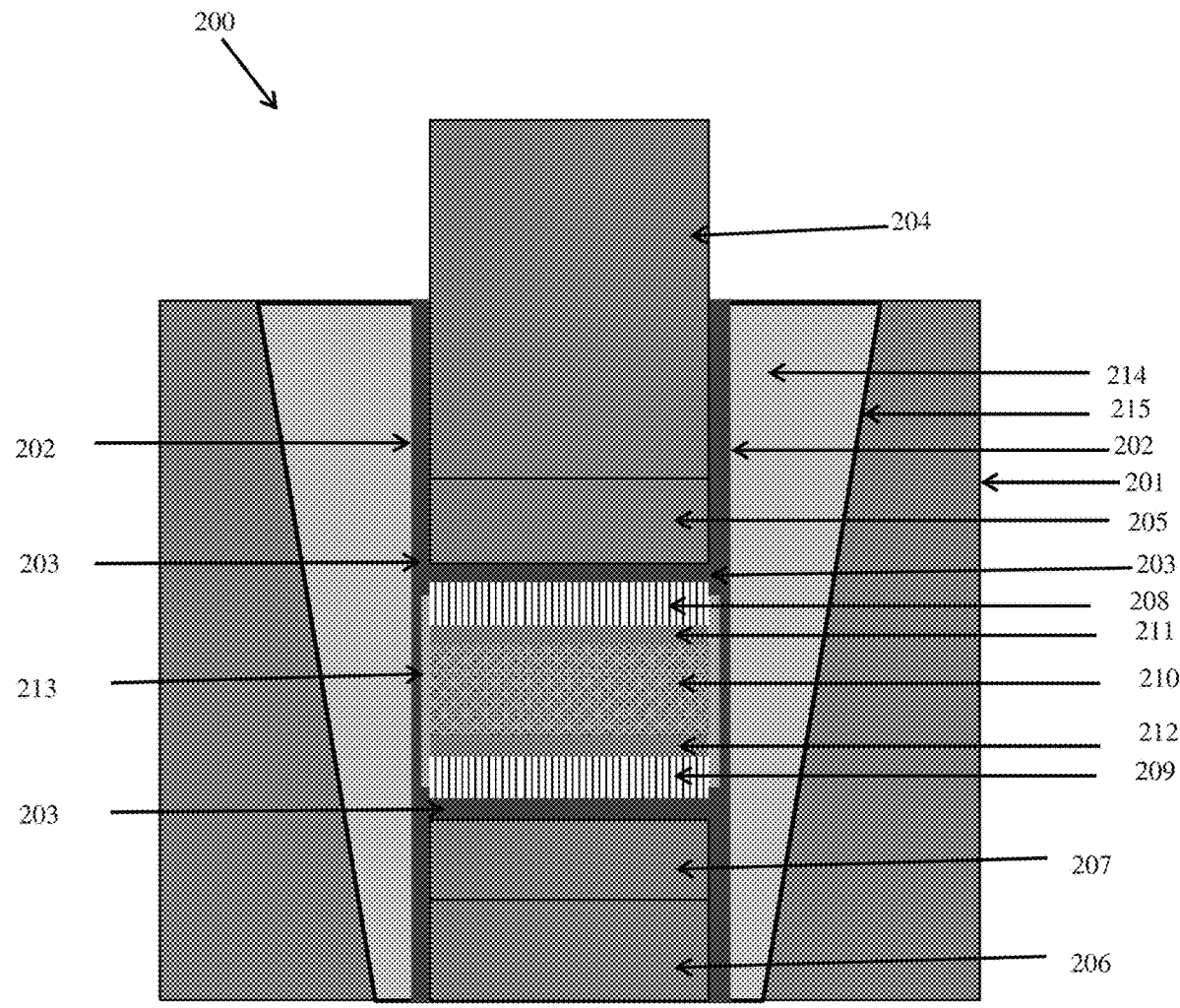
FIG. 2 includes a schematic illustrating a portion of an apparatus in accordance with an embodiment.

At block 102, the process 100 can continue by forming the $B_6O_X$ powder into a material including a body. In an embodiment, forming the material can include applying a pressure, or a heat, or both to the $B_6O_X$ powder. For instance, forming the material including a body can be conducted in an apparatus that can allow heating and pressing to be performed, such as a hot press. FIG. 2 includes an illustration of a portion of an apparatus 200 including a mold 201, a first pressing element 204, and a second pressing element 206. A tapered sleeve 214 can be disposed against an inner surface 214 of the mold 201. The mold 201 and the tapered sleeve 214 can include graphite. The inner surface 202 of the tapered sleeve 214 defines a chamber, where pressing, heating, or both can be performed. As illustrated, the second pressing element 206 can be axially aligned with the first pressing element 204. In one embodiment, the apparatus 200 may include a single pressing element, such as one of the first and second pressing elements, 204 and 206. The first and second pressing elements 204 and 206 can include a material that can withstand the process, such as a refractory metal or ceramic (e.g., boron nitride) or graphite or any combination thereof. In a particular embodiment, the first and second pressing element can be made of graphite. The material of the first and second pressing elements 204 and 206 may be the same or different.

The apparatus 200 can further include a first spacer 205 adjacent a bottom surface of the first pressing element 204, and a second spacer 207 adjacent an upper surface of the second pressing element 206. The distance between the first and second spacers 205 and 207 can be adjusted to form bodies having different thickness. In a pressing operation, the first pressing element 204 and the second element 206 can push uniaxially toward each other such that the first pressing element 204 can come into contact with the first spacer 205, the second pressing element 206 the second spacer 207. In an embodiment, the first and second spacers 205 and 207 can include a heat resistant material, which can be the same as the material that forms the pressing elements. For example, both spacers can include graphite. In one embodiment, the apparatus 200 can include a third spacer, which can allow simultaneous formation of two bodies of the material. After reading this disclosure, a skilled artisan would understand more than three spacers may be used in the apparatus 200 to allow formation of more bodies at the same time.

As illustrated, a barrier film 203 can be disposed along an inner surface 202 of the sleeve 215. The barrier film 203 can be in direct contact with the inner surface 202. In an embodiment, the barrier film 203 can be disposed over an entire inner surface area of the mold 201. In a further embodiment, the peripheral surfaces of the first and second spacers 205 and 207 can be in direct contact with the barrier film 203. Particularly, air gaps between the peripheral surfaces and the barrier film 203 and between the barrier film 203 and the inner surface 202 of the mold 201 can be minimized to the extent possible to allow the spacers 205 and 207 to fit snugly into the mold 201. In a further embodiment, the barrier film 203 can include a metal element, such as a transition metal element selected from Groups 4 to 12 of the periodic table published by IUPAC on Nov. 28, 2016. In a particular aspect, the barrier film 203 can include tantalum. In another particular aspect, the barrier film 203 can include a metal foil, such as a tantalum foil. In a more particular aspect, the barrier film can consist essentially of a tantalum foil. In another embodiment, the barrier film can have a particular thickness that can facilitate improved formation and stoichiometry of a body including $B_6O_X$ and improved properties of the body including $B_6O_X$. For instance, the barrier film 203 can have a thickness of at least 45 microns, such as at least 50 microns, at least 60 microns, at least 70 microns, or at least 75 microns. In another instance, the barrier film 203 can have a thickness of at most 100 microns, such as at most 90 microns, at most 85 microns, or at most 80 microns, or at most 78 microns. Moreover, the barrier film 203 can include a thickness in a range including any of the minimum and maximum values noted herein, such as in a range from 45 microns to 100 microns or in a range from 70 microns to 80 microns.

As illustrated in FIG. 2, the barrier film 203 can extend along a peripheral surface of the first spacer 205 and at least a portion of the peripheral surface of the first pressing element 204. In an embodiment, the barrier film 203 can be disposed such that the entire peripheral surface area of the first spacer 205 can be isolated from other components by the barrier film 203. In another embodiment, the barrier film 203 can be disposed underlying the bottom surface of the first spacer 205. In a particular embodiment, the entire bottom surface area of the first spacer 205 is covered by the barrier film 203. The barrier film 203 can also extend along a peripheral surface of the second spacer 207 and at least a portion of the peripheral surface of the second pressing element 206. In an embodiment, the barrier film 203 can be disposed such that the entire peripheral surface area of the second spacer 207 can be isolated from other components by the barrier film 203. In another particular embodiment, and the barrier film 203 can be disposed overlying the upper surface of the second spacer 207 and more particularly covering the entire upper surface area of the second spacer 207. In yet another embodiment, the entire inner surface 202 can be isolated from the components of the apparatus 200 by the barrier film 203. In a further embodiment, the barrier film 203 can be in direct contact with the first and second pressing elements 204 and 206 and spacers 205 and 207. In one embodiment, an additional spacer, when used in the apparatus 200, can be wrapped with the barrier film 203 such that the peripheral surface area and the upper and bottom surface areas are isolated from other components by the barrier film 203.

As illustrated in FIG. 2, a layer 210 of the $B_6O_X$ powder can be disposed between the first and second spacers 205 and 207. In a particular implementation, a sintering aid is not added to the layer 210 of the $B_6O_X$ powder. In at least one embodiment, a sealant layer 208 can be disposed between the $B_6O_X$ powder layer 210 and the barrier film 203 underlying the first spacer 205. In an aspect, the sealant layer 208 can be in direct contact with the barrier film 203. In a further embodiment, an additional sealant layer 209 can be disposed between the $B_6O_X$ powder layer 210 and the barrier film 203 overlying the second spacer 207. The sealant layer 209 can be in direct contact with the barrier film 203. In one embodiment, an additional layer can be disposed between a sealant layer and the barrier film or between a sealant layer and the $B_6O_X$ powder layer. For instance, as illustrated, the release layers 211 and 212 can be disposed between the $B_6O_X$ powder layer 210 and the sealant layer 208 and between the sealant layer 209 and the $B_6O_X$ powder layer 210, respectively. In an aspect, the release layers 211 and 212 can be in the form of a tape. In a further aspect, the release layers 211 and 212 can help to prevent the material of the sealant layer from contaminating the $B_6O_X$ powder during the pressing operation.

In a further embodiment, a release layer 213 can be applied such that the barrier film 203 can be separated from the layer 210, which may further facilitate removal of the finally formed body from the mold 201. In an aspect, the release layer 213 can extend along a thickness of the layer 210 and over an entire peripheral surface area of the layer 210. In another aspect, the release layer 213 may extend over at least a portion or all of the peripheral surface area of the release layer 211, 212, or both. In still another aspect, the release layer 213 may extend at least partially over the peripheral surface area of the sealant layer 208, 209 or both. In a further aspect, the release layer 213 can extend over the entire surface area of the barrier film 203. In still another aspect, the release layer 213 can be in direct contact with the $B_6O_X$ powder layer 210, the sealant layer 208 and 209, or any combination thereof.

In an embodiment, the sealant layer (208, 209, or both) and the release layer (any or all of 211, 212, and 213) can include the same material. In an aspect, the material can include an element common to the $B_6O_X$ powder. For instance, the release layer and the sealant layer can include boron. In a further aspect, the release layer and the sealant layer can include a nitride. In a particular aspect, the release layer and the sealant layer can include boron nitride, or more particularly, can consist essentially of boron nitride.

In another embodiment, the same material can be present in the different form in the sealant layer than in the release layer. In a particular aspect, the sealant layer 208 and 209 can include boron nitride powder. In another aspect, boron nitride particles may facilitate formation of a seal around the $B_6O_X$ powder layer, which may help to prevent a potential contaminating element from going into the $B_6O_X$ powder and an element (e.g., boron) of $B_6O_X$ from escaping during the pressing or heating operation. In a further aspect, the boron nitride particles can have a particular average particle size that can facilitate sealing the $B_6O_X$ powder layer. For instance, boron nitride can have an average particle size ($d_{50}$) of at least 5 microns, at least 6 microns, at least 7 microns, at least 8 microns, or at least 10 microns. In another instance, the average particle size of boron nitride can be at most 30 microns, at most 28 microns, at most 25 microns, at most 22 microns, at most 20 microns, at most 18 microns, or at most 15 microns. In still another instance, boron nitride can have an average particle size in a range including any of the minimum and maximum values noted herein, such as in a range including at least 5 microns and at most 30 microns or in a range from 8 microns to 15 microns.

A sufficient amount of boron nitride powder can be used to reach a thickness that can facilitate sealing performance of the sealant layer. For example, the sealant layer 208 and 209 can have a thickness of at least 3 mm, such as at least 4 mm, at least 5 mm, at least 6 mm, or at least 7 mm. In another instance, the sealant layer 208 and 209 can have a thickness of at most 10 mm, such as at most 9 mm, at most 8 mm, or at most 7 mm. Moreover, the thickness of the sealant layer 208 and 209 can be in a range including any of the minimum and maximum values, such as in a range from at least 3 mm to at most 10 mm.

In an embodiment, the release layers 211 and 212 can be a release tape, which may be formed via screen printing, freeze-casting process, a tape casting process, or the like. For instance, a mixture including boron nitride, ethanol, acetone, and a binder material (e.g., PVB) can be used to form a release tape using a conventional tape casting process.

In another embodiment, the release layer 213 may be formed using the same mixture used to form the release layers 211 and 212. In another embodiment, the release layer 213 can be applied by brushing, spraying, or using a similar process to the peripheral surface of the $B_6O_X$ powder layer 210. Alternatively, the release layer 213 can be applied to the barrier film 203 to prevent direct contact between the barrier film 203 and the layer 210. In a further aspect, the layer 210 can be placed in the mold 201 after the applied release layer 213 is dried. In another aspect, the release layer (any or all of 211, 212, and 213) can have a particular thickness that can facilitate improved formation and properties of the body, such as in a range from 0.1 mm to 1 mm or in a range from 0.2 mm to 0.5 mm.

In a particular embodiment, the process 100 can include applying a heat and pressure to the $B_6O_X$ powder layer 210. For instance, the process can include hot isostatic pressing, hot pressing, or the like. In another particular embodiment, the apparatus 200 can be a hot press. In an aspect, heating can be conducted at an atmosphere of vacuum, an inert gas, such as argon, or a combination thereof. In another aspect, heating can be conducted at a first temperature from 400° C. to 800° C. for a first period of time, such as 15 minutes to 60 minutes, followed by a second temperature from 1000° C. to 2400° C., for a second period of time from 15 minutes to 6 hours. In a further aspect, a particular pressure can be applied to the layer 210 to facilitate improved formation of the body including $B_6O_X$. For example, the pressure can be at least 10 MPa or at least 15 MPa or at least 20 MPa. In another instance, the pressure can be at most 100 MPa or at most 80 MPa or at most 70 MPa or at most 60 MPa or at most 50 MPa or at most 40 MPa or at most 30 MPa. Moreover, the pressure can be in a range including any of the minimum and maximum values noted herein, such as in a range from 10 MPa to 100 MPa or in a range from 15 MPa to 40 MPa.

In an exemplary pressing operation, the assembly illustrated in FIG. 2 can be formed as follows. The inner surface 202 of the mold 201 can be lined with the barrier film 203, which can help to prevent reaction between the $B_6O_X$ powder and the inner surface and to seal the $B_6O_X$ powder (e.g., by reducing the likelihood of boron escaping from the $B_6O_X$ powder during the pressing or heating process). A thin release layer 213 can be coated on the surface of the barrier film 203 to facilitate removal of the finally formed material body. Then the second pressing element 206 can be disposed at the bottom of the chamber, and the second spacer 207 placed over the pressing element 206. A barrier film 203 can be disposed on the second spacer 207, and a sufficient amount of boron nitride powder can be disposed directly onto the barrier film 203 over the second spacer 207 to form a sealant layer 209. A release tape 212 can be disposed on the sealant layer 209, on which the $B_6O_X$ powder can be loaded. Another release tape 211 can be placed over the $B_6O_X$ powder, followed by a sealant layer 208. A further barrier film 203 can be placed over the sealant layer 208 before the first spacer 205 and pressing element 204 can be placed. The assembly can then be loaded into a hot press furnace for a sintering operation. The furnace temperature can be ramped up to 600° C. at a rate of 4° C./min and held at 600° C. for 30 min in a vacuum atmosphere with an applied pressure of 1.3 MPa. Then the temperature can be ramped up to 1200° C. at a rate of 10° C./min in the same atmosphere and under the same pressure. The atmosphere can be switched to argon and pressure of 24 MPa when the temperature reaches 1200° C. and is further increased to 2000° C. The temperature and pressure can be held for 30 min, and then the pressure can be removed and the furnace cool down to room temperature (20 to 25° C.) at a rate of 10° C./min. The material including a body including $B_6O_X$ can be formed.

Figure 3:
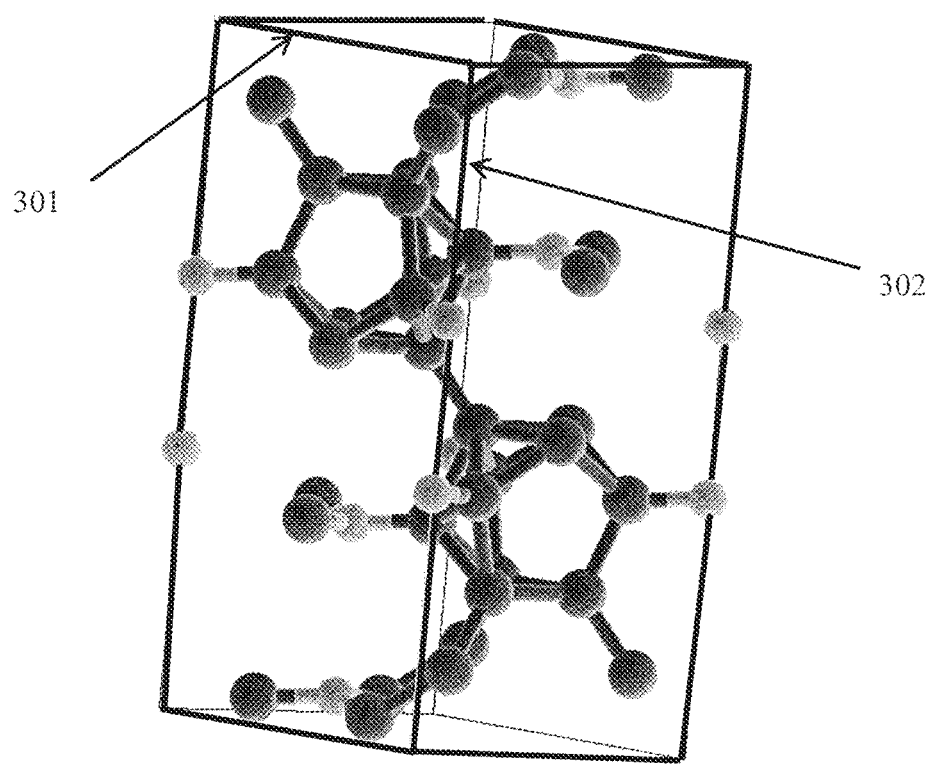
FIG. 3 includes a schematic illustrating crystalline structure of stoichiometric $B_6O$.

In an embodiment, the material can include an improved stoichiometry. The stoichiometry of $B_6O_X$ can be analyzed by using X-ray diffraction, and the value of X can be determined based on the values of lattice constants a and c. FIG. 3 includes a schematic illustrating the crystalline structure of stoichiometric $B_6O$ including lattice constant a 301 and lattice constant c 302.

As used herein, X of $B_6O_X$ is an average of Xa and Xc and determined by the formula, $X=(Xa+Xc)/2$, wherein $Xa=(A-5.26)/0.1347$, $Xc=(C-12.410)/(-0.10435)$, A represents the value of lattice constant a, and C represents the value of lattice constant c. The formulas for determining X, Xa, and Xc are described by Hubert, H., et al., "High-Pressure, High-Temperature Synthesis and Characterization of Boron High-Pressure, High-Temperature Synthesis and Characterization of Boron Suboxide" Chemistry Materials, 10, 1530-1537 (1998), which is incorporated by reference herein in its entirety and referred to as "Hubert" hereinafter.

In an embodiment, the $B_6O_X$ can have a particular value (A) of lattice constant a. For instance, A can be at least 5.378, at least 5.379, at least 5.380, at least 5.381, at least 5.382, at least 5.383, such as at least 5.384, at least 5.385, at least 5.386, at least 5.387, at least 5.388, at least 5.389, at least 5.390, at least 5.391, at least 5.392, at least 5.393, at least 5.394, at least 5.395, at least 5.396, at least 5.397, at least 5.398, at least 5.399, at least 5.400, or at least 5.401. In another embodiment, A can be at most 5.412, at most 5.411, at most 5.410, at most 5.409, at most 5.408, at most 5.407, at most 5.406, at most 5.405, at most 5.403, or at most 5.402. It is to be understood that A can be in a range including any of the minimum and maximum values noted herein, such as in a range from 5.378 to 5.412 or in a range from 5.383 to 5.412.

In an embodiment, the $B_6O_X$ can include a particular value (C) of lattice constant c, such as at most 12.321, at most 12.320, at most 12.319, at most 12.318, at most 12.317, at most 12.316, at most 12.315, at most 12.314, at most 12.313, at most 12.312, at most 12.311, at most 12.310, at most 12.309, at most 12.308, or at most 12.307. In another embodiment, lattice constant c can be at least 12.295, at least 12.296, at least 12.297, at least 12.298, at least 12.299, at least 12.300, at least 12.301, or at least 12.302. It is to be understood that C can be in a range including any of the minimum and maximum values noted herein, such as in a range from 12.295 to 12.321 or in a range from 12.295 to 12.318. In a particular embodiment, the $B_6O_X$ can include C of at most 12.318 and A of at least 5.383. In a more particular embodiment, the $B_6O_X$ can include C in a range from 12.295 to 12.318 and A from 5.383 to 5.412.

In an embodiment, the $B_6O_X$ can have a particular Xa, such as at least 0.85, at least 0.87, at least 0.88, or at least 0.89, at least 0.90, at least 0.91, at least 0.92, at least 0.93, at least 0.94, at least 0.95, at least 0.96, at least 0.97, at least 0.98, or at least 0.99. In another embodiment, Xa can be at most 1.1, or at most 1.08, at most 1.05, at most 1.02, or at most 1.0, or at most 0.99. Moreover, Xa can be in a range including any of the minimum and maximum values noted herein, such as in a range from 0.85 to 1.1, or in a range from 0.9 to 1.1.

In an embodiment, the $B_6O_X$ can include a particular Xc, such as at least 0.85, at least 0.87, at least 0.88, or at least 0.89, at least 0.90, at least 0.91, at least 0.92, at least 0.93, at least 0.94, at least 0.95, at least 0.96, at least 0.97, at least 0.98, or at least 0.99. In another embodiment, Xc can be at most 1.1, or at most 1.08, at most 1.05, at most 1.02, or at most 1.0, or at most 0.99. Moreover, Xc can be in a range including any of the minimum and maximum values noted herein, such as in a range from 0.85 to 1.1, or in a range from 0.9 to 1.1. In a particular embodiment, each of Xa and Xc can be in a range from 0.85 to 1.2, or in a range from 0.9 to 1.1.

In an embodiment, X of the $B_6O_X$ can be at least 0.85, at least 0.86, at least 0.87, at least 0.88, at least 0.89, at least 0.90, at least at least 0.91, or at least 0.92, or at least 0.93, or at least 0.94, or at least 0.95, or at least 0.96, or at least 0.97, or at least 0.98, or at least 0.98, or at least 0.99, or at least 1.0. In another embodiment, X can be at most 1.1, at most 1.08, at most 1.0, at most 0.99, at most 0.98, at most 0.97, at most 0.96, or at most 0.95. It is to be understood that X can be in a range including any of the minimum and maximum values noted herein, such as in a range from 0.85 to 1.1 or in a range from 0.9 to 1.1.

In an embodiment, the material can include a polycrystalline phase including $B_6O_X$. In a further embodiment, the polycrystalline phase can be present in a particular content that can facilitate improved properties and performance of the material. For example, the polycrystalline phase can have a content of at least 85 vol % for the total volume of the material, at least 90 vol %, at least 91 vol %, at least 92 vol %, at least 93 vol %, at least 94 vol %, at least 95 vol %, at least 96 vol %, at least 97 vol %, at least 98 vol %, or at least 99 vol % for the total volume of the material. In one embodiment, the material may include a phase other than the polycrystalline phase, such as an amorphous phase. The amorphous phase may be present in a content of at most 10 vol % for a total volume of the material, such as at most 9 vol % or at most 8 vol % or at most 7 vol % or at most 6 vol % or at most 5 vol % or at most 4 vol % or at most 3 vol % or at most 2 vol % or at most 1 vol % of an amorphous phase for a total volume of the material. In a particular embodiment, the material may be essentially free of an amorphous phase. In another particular embodiment, the material can consist essentially of a polycrystalline phase including $B_6O_X$. In a further particular embodiment, the polycrystalline phase can consist essentially of $B_6O_X$.

In an embodiment, the material can include a particular content of $B_6O_X$ that can facilitate improved properties and performance of the material. For example, the material can include at least 90 vol % $B_6O_X$ for a total volume of the body or at least 91 vol % or at least 92 vol % or at least 93 vol % or at least 94 vol % or at least 95 vol % or at least 96 vol % or at least 97 vol % or at least 98 vol % or at least 99 vol % of $B_6O_X$ for a total volume of the material. In a particular embodiment, the material can include a monolithic body. In another particular embodiment, the material can consist essentially of $B_6O_X$.

In one embodiment, the material can include a compound including an element other than boron and other than oxygen. Such compound may be present in a content of at most 5 wt % for a total weight of the material, such as at most 4 wt % or at most 3 wt % or at most 2 wt % for the total weight of the material. The compound may be resulted from an impurity carried by the raw materials (e.g., boron powder), such as Mg or Si. In an embodiment, the material may not include an intentionally added compound or sintering aid, such as $SiO_2$. In a further embodiment, the material is essentially free of carbides, nitrides, borides, or any combination thereof. In another embodiment, the material can be essentially free of alkaline elements, transition metal elements, rare earth elements, or any combination thereof. In a particular embodiment, the material may not include a carbide, nitride, boride, an alkaline element, a transition metal element, a rare earth element, or any combination thereof.

In an embodiment, the material can include a density, such as a particular percent of theoretical density. For instance, the percent of theoretical density can be at least 91%, or at least 92%, or at least 93%, or at least 94%, or at least 95%, or at least 96%, or at least 97%, or at least 98%, or at least 99%.

In another embodiment, the material can include an average density of at least 2.20 g/cm³ or at least 2.30 g/cm³ or at least 2.40 g/cm³ or at least 2.45 g/cm³ or at least 2.50 g/cm³ or at least 2.55 g/cm³. In another embodiment, the average density may be at most 2.70 g/cm³ or at most 2.65 g/cm³ or at most 2.63 g/cm³ or at most 2.60 g/cm³. Moreover, the average density may be in a range including any of the minimum and maximum values noted herein, such as in a range from 2.50 g/cm³ to 2.63 g/cm³. An average density is intended to refer to an average of the density measurements of at least 3 statistically relevant regions of the material.

In an embodiment, the material can include a Knoop hardness at 100 g of at least 2700 kg/mm², at least 2800 kg/mm², at least 2900 kg/mm², at least 3000 kg/mm², or at least 3100 kg/mm². In another embodiment, the Knoop hardness at 100 g of at most 4500 kg/mm², at most 4200 kg/mm², at most 4000 kg/mm², at most 3900 kg/mm², at most 3800 kg/mm², at most 3700 kg/mm², at most 3600 kg/mm², at most 3500 kg/mm², or at most 3400 kg/mm². It is to be understood that the material can have a Knoop hardness at 100 g including any of the minimum and maximum values noted herein, such as in a range from 2700 kg/mm² to 4200 kg/mm².

In an embodiment, the material can be formed having a particular dimension. For instance, the material can include a body having a length, a width, and a thickness, and wherein length>width and the width>thickness. The length, width, and thickness of the body may be determined by the application of the material. In a further embodiment, the length can be at least 10.5 cm or at least 11 cm or at least 12 cm or at least 15 cm or at least 18 cm. In some instances, the length may be at most 50 cm or at most 45 cm. It is to be understood that the length of the body can be in a range including any of the minimum and maximum values noted herein. In some other applications, the length of the body may be greater than 50 cm.

In an embodiment, the width of the body can be at least 10.0 cm, or at least 10.5 cm or at least 11 cm or at least 12 cm or at least 15 cm or at least 18 cm. In some applications, the width can be at most 50 cm. Moreover, the width of the body can be in a range including any of the minimum and maximum values noted herein. In at least one embodiment, width can include a diameter. In another embodiment, the body may have a cylindrical shape.

In a further embodiment, the body can have a particular thickness. In certain applications, thinner body may be desired. For instance, the thickness may be at most 12 mm, such as at most 11 mm or at least 10 mm or at most 8 mm or at most 7 mm or at most 6 mm or at most 5 mm, and at least 2 mm. In other applications, the thickness may be greater than 12 mm, such as at least 15 mm, or at least 20 mm, or even higher. In a further embodiment, the thickness of the body can be in a range including any of the minimum and maximum values noted herein.

In a further embodiment, the body can have a particular volume. For example, the body can include a volume of at least 50 cm³, at least 60 cm³, at least 70 cm³, at least 80 cm³, at least 95 cm³, at least 100 cm³, at least 108 cm³, at least 110 cm³, at least 120 cm³, at least 125 cm³, at least 130 cm³, at least 135 cm³, or at least 140 cm³. In another instance, the volume of the body can be at most 5000 cm³, at most 4500 cm³, at most 4000 cm³, at most 3500 cm³, at most 3000 cm³, at most 2500 cm³, at most 2000 cm³, at most 1500 cm³, at most 1000 cm³, at most 500 cm³ at most 400 cm³, or at most 300 cm³. Moreover, the volume can include any of the minimum and maximum values noted herein, such as in a range from 50 cm³ to 5000 cm³.

In a further embodiment, the material can include an areal density of at least 20.0 kg/m², at least 20.5 kg/m², at least 20.8 kg/m², at least 20.9 kg/m², at least 21.0 kg/m², at least 21.2 kg/m², at least 21.5 kg/m², or at least 21.8 kg/m². In yet another embodiment, the areal density can be at most 28.0 kg/m², such as at most 27.0 kg/m², or at most 26.0 kg/m². Moreover, the areal density may be in a range including any of the minimum and maximum values noted herein, such as in a range from 20.0 kg/m² to 26.0 kg/m². The areal density can be determined by dividing the weight of the material by the area of the major surface of the body of the material. For instance, the major surface can be the surface defined by the length and the width, where length>width>thickness. In another instance, the material can be used to form an armor component, such as a torso plate, the strike face would be the major surface to determine the areal density of the torso plate.

In an embodiment, the material can include a $V_{50}$ ballistic limit determined in accordance with MIL-STD-662 using a projectile of 7.62 mm×51 mm P80 and determined on the material having the thickness of 8.6 mm (referred to as the first $V_{50}$ ballistic limit in this disclosure). In an aspect, the first $V_{50}$ ballistic limit can be at least 710 m/s, at least 720 m/s, at least 730 m/s, at least 740 m/s, or at least 750 m/s. In another aspect, the first $V_{50}$ ballistic limit can be at most 950 m/s or at most 930 m/s or at most 890 m/s or at most 850 m/s or at most 800 m/s or at most 780 m/s or at most 755 m/s. Moreover, the first $V_{50}$ ballistic limit can be in a range including any of the minimum and maximum values noted herein.

In a further embodiment, the material can have a first average $V_{50}$ ballistic limit (the first $V_{50}$ ballistic limit/the thickness of 8.6 mm). In an aspect, the first average $V_{50}$ ballistic limit can be at least 78.5 m/s·mm, at least 79.0 m/s·mm, at least 80.0 m/s·mm, at least 81.0 m/s·mm, at least 81.5 m/s·mm, at least 82.0 m/s·mm, at least 82.5 m/s·mm, at least 83.0 m/s·mm, at least 84.0 m/s·mm, at least 84.5 m/s·mm, at least 85.0 m/s·mm, at least 85.5 m/s·mm, at least 86.0 m/s·mm, at least 87.0 m/s·mm, or at least 87.5 m/s·mm. In another aspect, the first average $V_{50}$ ballistic limit can be at most 110.5 m/s·mm or at most 108 m/s·mm or at most 103.5 m/s·mm or 98.8 m/s·mm or at most 93 m/s·mm or at most 90 m/s·mm or at most 87.8 m/s·mm. Moreover, the first average $V_{50}$ ballistic limit can be in a range including any of the minimum and maximum values noted herein.

In a further embodiment, the material may include a $V_{50}$ ballistic limit determined in accordance with MIL-STD-662 using an AP8 projectile of 7.62 mm×51 mm and determined on the body having a thickness of 8.6 mm (referred to as the second $V_{50}$ ballistic limit hereinafter). In an aspect, the second $V_{50}$ ballistic limit can be at least 710 m/s, at least 720 m/s, at least 730 m/s, at least 740 m/s, at least 750 m/s, or at least 760 m/s. In another aspect, the second $V_{50}$ ballistic limit can be at most 950 m/s or at most 930 m/s or at most 890 m/s or at most 850 m/s or at most 800 m/s or at most 780 m/s or at most 755 m/s. Moreover, the second $V_{50}$ ballistic limit can be in a range including any of the minimum and maximum values noted herein.

In a further embodiment, the material can have a second average $V_{50}$ ballistic limit (the second $V_{50}$ ballistic limit/the thickness of 8.6 mm) of at least 79.0 m/s·mm, at least 80.0 m/s·mm, at least 81.0 m/s·mm, at least 81.5 m/s·mm, at least 82.0 m/s·mm, at least 82.5 m/s·mm, at least 83.0 m/s·mm, at least 84.0 m/s·mm, at least 84.5 m/s·mm, at least 85.0 m/s·mm, at least 85.5 m/s·mm, at least 86.0 m/s·mm, at least 87.0 m/s·mm, at least 87.5 m/s·mm, or 88.3 m/s·mm. In another embodiment, the material can include a second average $V_{50}$ ballistic limit of at most 110.5 m/s·mm or at most 108 m/s·mm or at most 103.5 m/s·mm or 98.8 m/s·mm or at most 93 m/s·mm or at most 90 m/s·mm or at most 87.8 m/s·mm. Moreover, the second average $V_{50}$ ballistic limit can be in a range including any of the minimum and maximum values noted herein.

In an embodiment, the material can be used to form an object, wherein the object can have an average value of lattice constant a and average lattice constant c. As used herein, average lattice constant is intended to refer to an average of measurements of lattice constant of at least 5 statistically relevant regions of the object. In a further embodiment, the object can have a standard deviation of lattice constant a and c of the statistically relevant regions.

Figure 4:
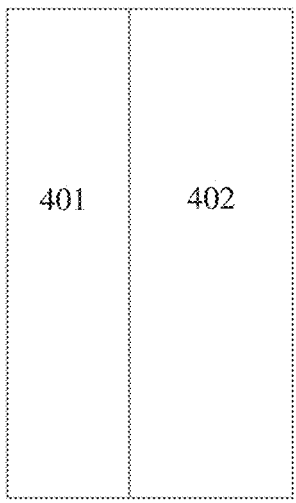
FIG. 4 includes a cross-sectional illustration of a portion of an armor component in accordance with an embodiment.
Figure 5:
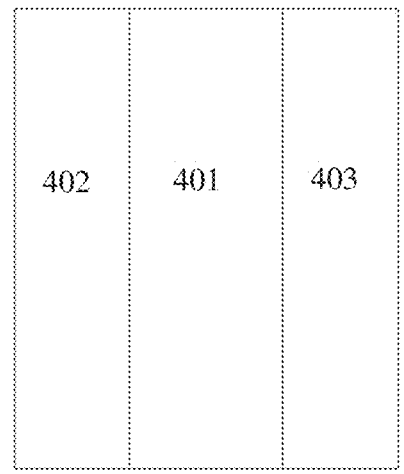
FIG. 5 includes a cross-sectional illustration of a portion of an armor component in accordance with another embodiment.

In an embodiment, the object can be an armor component. In another embodiment, an armor component can include the material including $B_6O_X$. In a further embodiment, the armor component can be made entirely of the body including $B_6O_X$. In still another embodiment, the armor component can be a composite including the body and at least one additional component. In an aspect, the additional component can include a material selected from the group consisting of metal, metal alloys, ceramics, glass, polymers, fabrics, or any combination thereof. In another aspect, the additional component can be a discrete structure separate from the body and coupled to at least one surface of the body. FIG. 4 includes a cross-sectional illustration of a portion of a composite armor component including a portion 401 that can be formed with the body including $B_6O_X$ and an additional component 402 that is coupled to a major surface of the portion 301. In yet another embodiment, the armor component can be a composite having a multilayered structure including the body. FIG. 5 includes an illustration of another composite armor component including a portion 401 that can be made of the body including $B_6O_X$ and disposed between additional components 402 and 403. It will be appreciated that various suitable arrangements of the portion made of the body relative to other components are contemplated and within the scope of the embodiments described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A material, having a body comprising $B_6O_X$, wherein the $B_6O_X$ comprises lattice constant a and lattice constant c, wherein A represents a value of constant a, and C represents a value of constant c, wherein C is at most 12.318.

Embodiment 2. A material, having a body comprising $B_6O_X$, wherein:
X=(Xa+Xc)/2, wherein Xa=(A−5.26)/0.1347, Xc=(C−12.410)/(−0.10435), A represents a value of lattice constant a, and C represents a value of lattice constant c; and
0.90≤X≤1.1.

Embodiment 3. A material, having a body comprising $B_6O_X$, wherein:
X=(Xa+Xc)/2, wherein Xa=(A−5.26)/0.1347, Xc=(C−12.410)/(−0.10435), A represents a value of lattice constant a, and C represents a value of lattice constant c;
0.85≤X≤1.1; and
Xc is at least 0.90.

Embodiment 4. A material, having a body comprising:
a polycrystalline phase including $B_6O_X$, wherein X=(Xa+Xc)/2, wherein Xa=(A−5.26)/0.1347, Xc=(C−12.410)/(−0.10435), A represents a value of lattice constant a, and C represents a value of lattice constant c, and wherein 0.85≤x≤1.1; and
an at most 10 vol % of an amorphous phase for a total volume of the body.

Embodiment 5. A material, having a body comprising $B_6O_X$,
wherein:
X=(Xa+Xc)/2, wherein Xa=(A−5.26)/0.1347, Xc=(C−12.410)/(−0.10435), A represents a value of lattice constant a, and C represents a value of lattice constant c, and wherein 0.85≤X≤1; and
wherein the body comprises:
a content of a compound including an element other than boron and other than oxygen of at most 5 wt % for a total weight of the body; and
a percent of theoretical density of at least 90%.

Embodiment 6. A material, having a body comprising $B_6O_X$, wherein:

X=(Xa+Xc)/2, wherein Xa=(A−5.26)/0.1347, Xc=(C−12.410)/(−0.10435), A represents a value of lattice constant a, and C represents a value of lattice constant c, and wherein 0.85≤X≤1; and wherein the body comprises a width of at least 10.0 cm.

Embodiment 7. The material of any one of embodiments 1 to 6, wherein X is at least 0.90, at least at least 0.91, or at least 0.92, or at least 0.93, or at least 0.94, or at least 0.95, or at least 0.96, or at least 0.97, or at least 0.98, or at least 0.98, or at least 0.99, or at least 1.0.

Embodiment 8. The material of any one of embodiments 1 to 6, wherein X is at most 1.2, at most 1.1, at most 1.0, at most 0.99, at most 0.98, at most 0.97, at most 0.96, or at most 0.95.

Embodiment 9. The material of any one of embodiments 1 to 6, wherein Xa is at least 0.85, at least 0.87, at least 0.88, or at least 0.89, at least 0.90, at least 0.91, at least 0.92, at least 0.93, at least 0.94, at least 0.95, at least 0.96, at least 0.97, at least 0.98, or at least 0.99.

Embodiment 10. The material of any one of embodiments 1 to 6, wherein Xa is at most 1.2, or at most 1.1, at most 1.05, at most 1.02, or at most 1.0, or at most 0.99.

Embodiment 11. The material of any one of embodiments 1 to 6, wherein Xc is at least 0.85, at least 0.87, at least 0.88, or at least 0.89, at least 0.90, at least 0.91, at least 0.92, at least 0.93, at least 0.94, at least 0.95, at least 0.96, at least 0.97, at least 0.98, or at least 0.99.

Embodiment 12. The material of any one of embodiments 1 to 6, wherein Xc is at most 1.2, or at most 1.1, at most 1.05, at most 1.02, at most 1.0, or at most 0.99.

Embodiment 13. The material of any one of embodiments 1 to 6, wherein each of Xa and Xc is at least 0.90, or at least 0.91, or at least 0.92, or at least 0.93, or at least 0.94, or at least 0.95, or at least 0.96, or at least 0.97, or at least 0.98, or at least 0.98, or at least 0.99.

Embodiment 14. The material of any one of embodiments 1 to 6, wherein each of Xa and Xc is at most 1.20 or at most 1.10 or at most 1.05 or at most 1.02.

Embodiment 15. The material of any one of embodiments 1 to 6, wherein the A is at least 5.383, at least 5.384, at least 5.385, at least 5.386, at least 5.387, at least 5.388, at least 5.389, at least 5.390, at least 5.391, at least 5.392, at least 5.393, at least 5.394, at least 5.395, at least 5.396, at least 5.397, at least 5.398, at least 5.399, at least 5.400, at least 5.401.

Embodiment 16. The material of any one of embodiments 1 to 6, wherein the C is at most 12.318, at most 12.317, at most 12.317, at most 12.316, at most 12.315, at most 12.314, at most 12.313, at most 12.312, at most 12.311, at most 12.310, at most 12.309, at most 12.308, or at most 12.307.

Embodiment 17. The material of any one of embodiments 1 to 6, wherein the body comprises a polycrystalline phase including $B_6O_X$ and at most 10 vol % of an amorphous phase or at most 9 vol % or at most 8 vol % or at most 7 vol % or at most 6 vol % or at most 5 vol % or at most 4 vol % or at most 3 vol % or at most 2 vol % or at most 1 vol % of an amorphous phase for a total volume of the body.

Embodiment 18. The material any one of embodiments 1 to 6, wherein the body comprises a polycrystalline phase including $B_6O_X$ and wherein the polycrystalline phase has a content of at least 85 vol %, at least 90 vol %, at least 91 vol %, at least 92 vol %, at least 93 vol %, at least 94 vol %, at least 95 vol %, at least 96 vol %, at least 97 vol %, at least 98 vol %, or at least 99 vol % for a total volume of the body.

Embodiment 19. The material of any one of embodiments 1 to 6, wherein the body consists essentially of a polycrystalline phase including $B_6O_X$.

Embodiment 20. The material of any one of embodiments 1 to 6, wherein the body comprises at least 90 vol % $B_6O_X$ for a total volume of the body or at least 91 vol % or at least 92 vol % or at least 93 vol % or at least 94 vol % or at least 95 vol % or at least 96 vol % or at least 97 vol % or at least 98 vol % or at least 99 vol % of $B_6O_X$ for a total volume of the body.

Embodiment 21. The material of any one of embodiments 1 to 6, wherein the body is a monolithic form comprising $B_6O_X$.

Embodiment 22. The material of any one of embodiments 1 to 6, wherein the body consists essentially of $B_6O_X$.

Embodiment 23. The material of any one of embodiments 1 to 6, wherein the body comprises a content of a compound including an element other than boron and other than oxygen of at most 5 wt % for a total weight of the body or at most 4 wt % or at most 3 wt % or at most 2 wt % for the total weight of the body.

Embodiment 24. The material of any one of embodiments 1 to 6, wherein the body is essentially free of an intentionally added sintering aid.

Embodiment 25. The material of any one of embodiments 1 to 6, wherein the body comprises a percent of theoretical density of at least 91%, or at least 92%, or at least 93%, or at least 94%, or at least 95%, or at least 96%, or at least 97%, or at least 98%, or at least 99%.

Embodiment 26. The material of any one of embodiments 1 to 6, wherein the body comprises a Knoop hardness at 100 g of at least 2700 kg/mm², at least 2800 kg/mm², at least 2900 kg/mm², at least 3000 kg/mm², or at least 3100 kg/mm².

Embodiment 27. The material of any one of embodiments 1 to 6, wherein the body comprises a Knoop hardness at 100 g of at most 4500 kg/mm², at most 4200 kg/mm², at most 4000 kg/mm², at most 3900 kg/mm², at most 3800 kg/mm², at most 3700 kg/mm², at most 3600 kg/mm², at most 3500 kg/mm², or at most 3400 kg/mm².

Embodiment 28. The material of any one of embodiments 1 to 6, wherein the body comprises an average density of at least 2.00 g/cm³ or at least 2.10 g/cm³ or at least 2.20 g/cm³ or at least 2.30 g/cm³ or at least 2.40 g/cm³ and at most 2.63 g/cm³.

Embodiment 29. The material of any one of embodiments 1 to 6, wherein the body comprises a volume of at least 108 cm³, at least 110 cm³, at least 120 cm³, at least 125 cm³, at least 130 cm³, at least 135 cm³, or at least 140 cm³ and not greater than 250 cm³.

Embodiment 30. The material of any one of embodiments 1 to 6, wherein the body comprises a length, a width, and a thickness, and wherein length>width and the width>thickness.

Embodiment 31. The material of embodiment 30, wherein the length is at least 10.5 cm or at least 11 cm or at least 12 cm or at least 15 cm or at least 18 cm.

Embodiment 32. The material of embodiment 30, wherein the length is not greater than 50 cm.

Embodiment 33. The material of embodiment 30, wherein the width is at least 10.5 cm or at least 11 cm or at least 12 cm or at least 15 cm or at least 18 cm.

Embodiment 34. The material of embodiment 30, wherein the width is not greater than 50 cm.

Embodiment 35. The material of embodiment 30, wherein the thickness is at most 12 mm or at most 11 mm or at least 10 mm or at most 8 mm or at most 7 mm or at most 6 mm or at most 5 mm.

Embodiment 36. The material of any one of embodiments 1 to 6, wherein the body comprises an areal density of at least 20.0 kg/m$^2$, at least 20.5 kg/m$^2$, at least 20.8 kg/m$^2$, at least 20.9 kg/m$^2$, at least 21.0 kg/m$^2$, at least 21.2 kg/m$^2$, at least 21.5 kg/m$^2$, or at least 21.8 kg/m$^2$, and at most 26.0 kg/m$^2$.

Embodiment 37. The material of any one of embodiments 1 to 6, wherein the body comprises an average $V_{50}$ ballistic limit ($V_{50}$ ballistic limit/thickness of the body) of at least 78.5 m/s·mm, at least 79.0 m/s·mm, at least 80.0 m/s·mm, at least 81.0 m/s·mm, at least 81.5 m/s·mm, at least 82.0 m/s·mm, at least 82.5 m/s·mm, at least 83.0 m/s·mm, at least 84.0 m/s·mm, at least 84.5 m/s·mm, at least 85.0 m/s·mm, at least 85.5 m/s·mm, at least 86.0 m/s·mm, at least 87.0 m/s·mm, or at least 87.5 m/s·mm.

Embodiment 38. The material of any one of embodiments 1 to 6, wherein the body comprises an average $V_{50}$ ballistic limit ($V_{50}$ ballistic limit/thickness of the body) of at most 110.5 m/s·mm, or at most 108 m/s·mm or at most 103.5 m/s·mm or at most 98.8 m/s·mm or at most 93 m/s·mm or at most 90 m/s·mm or at most 87.8 m/s·mm.

Embodiment 39. An armor component, comprising a body including $B_6O_X$, wherein X=(Xa+Xc)/2, wherein Xa=(A−5.26)/0.1347, Xc=(C−12.410)/(−0.10435), A represents a value of lattice constant a, and C represents a value of lattice constant c, and wherein 0.85≤x≤1.1.

Embodiment 40. The armor component of embodiment 39, wherein the body further comprises at least one of the following:
Xc is at least 0.89;
A is at least 5.396;
C is at most 12.318;
a polycrystalline phase including $B_6O_X$ and an at most 10 vol % of an amorphous phase for a total volume of the body;
a compound including an element other than boron and other than oxygen of at most 5 wt % for a total weight of the body and at least 90% of a theoretical density; and
a compound including an element other than boron and other than oxygen of at most 5 wt % for a total weight of the body and a hardness of a Knoop hardness at 100 g of at least 2700 kg/mm$^2$.

Embodiment 41. The armor component of embodiment 39 or 40, wherein the body comprises at least 90 vol % $B_6O_X$ for a total volume of the body, or at least 91 vol % or at least 92 vol % or at least 92 vol % or at least 93 vol % or at least 94 vol % or at least 95 vol % or at least 96 vol % or at least 97 vol % or at least 98 vol % or at least 99 vol %.

Embodiment 42. The armor component of embodiment 39 or 40, wherein the body consists essentially of $B_6O_X$.

Embodiment 43. The armor component of embodiment 39 or 40, wherein the body comprises a Knoop hardness at 100 g of at least 2700 kg/mm$^2$, at least 2800 kg/mm$^2$, at least 2900 kg/mm$^2$, at least 3000 kg/mm$^2$, or at least 3100 kg/mm$^2$.

Embodiment 44. The armor component of embodiment 39 or 40, wherein the body comprises a Knoop hardness at 100 g of at most 4500 kg/mm$^2$, at most 4200 kg/mm$^2$, at most 3900 kg/mm$^2$, at most 3800 kg/mm$^2$, at most 3700 kg/mm$^2$, at most 3600 kg/mm$^2$, at most 3500 kg/mm$^2$, or at most 3400 kg/mm$^2$.

Embodiment 45. The armor component of embodiment 40 or 41, wherein the body comprises an areal density of at least 20.0 kg/m$^2$, at least 20.5 kg/m$^2$, at least 20.8 kg/m$^2$, at least 20.9 kg/m$^2$, at least 21.0 kg/m$^2$, at least 21.2 kg/m$^2$, at least 21.5 kg/m$^2$, or at least 21.8 kg/m$^2$, and at most 26.0 kg/m$^2$.

Embodiment 46. The armor component of embodiment 40 or 41, wherein the body comprises wherein the body comprises an average $V_{50}$ ballistic limit ($V_{50}$ ballistic limit/thickness of the body) of at least 78.5 m/s·mm, at least 79.0 m/s·mm, at least 80.0 m/s·mm, at least 81.0 m/s·mm, at least 81.5 m/s·mm, at least 82.0 m/s·mm, at least 82.5 m/s·mm, at least 83.0 m/s·mm, at least 84.0 m/s·mm, at least 84.5 m/s·mm, at least 85.0 m/s·mm, at least 85.5 m/s·mm, at least 86.0 m/s·mm, at least 87.0 m/s·mm, or at least 87.5 m/s·mm.

Embodiment 47. The armor component of embodiment 39 or 40, wherein the body comprises an average $V_{50}$ ballistic limit ($V_{50}$ ballistic limit/thickness of the body) of at most 87.8 m/s·mm.

Embodiment 48. The armor component of embodiment 39 or 40, wherein the armor component is made entirely of the body.

Embodiment 49. The armor component of embodiment 39 or 40, wherein the armor component is a composite including the body and at least one additional component.

Embodiment 50. The armor component of embodiment 49, wherein at least one additional component comprises a material selected from the group consisting of metal, metal alloys, ceramics, glass, polymers, fabrics, or any combination thereof.

Embodiment 51. The armor component of embodiment 49, wherein the at least one additional component is a discrete structure separate from the body and coupled to at least one surface of the body.

Embodiment 52. The armor component of embodiment 49, wherein the composite is a multilayered structure.

Embodiment 53. The material or armor component of any one of embodiments 1 to 6, 39, and 40, wherein the body is essentially free of carbides, nitrides, borides, or any combination thereof.

Embodiment 54. The material or armor component of any one of embodiments 1 to 6, 39, and 40, wherein the body is essentially free of alkaline elements, transition metal elements, rare earth elements, or any combination thereof.

Embodiment 55. A method, comprising forming a material including a body including $B_6O_X$, wherein X=(Xa+Xc)/2, wherein Xa=(A−5.26)/0.1347, Xc=(C−12.410)/(−0.10435), A represents a value of lattice constant a, and C represents a value of lattice constant c, and wherein 0.85≤X≤1.1, and wherein the body further includes at least one of the following:
X being at least 0.90;
Xc being at least 0.89;
C is at most 12.318;
a polycrystalline phase including $B_6O_X$ and an at most 10 vol % of an amorphous phase for a total volume of the body;
a compound including an element other than boron and other than oxygen of at most 5 wt % for a total weight of the body and at least 90% of a theoretical density; and
a compound including an element other than boron and other than oxygen of at most 5 wt % for a total weight of the body and a hardness of a Knoop hardness at 100 g of at least 2700 kg/mm$^2$.

Embodiment 56. The method of embodiment 55, further comprising forming a powder material including $B_6O_X$ without applying an exogenous force.

Embodiment 57. The method of embodiment 55, further comprising disposing a sealant layer over the powder material, wherein the sealant layer comprises a first material in a form of powder.

Embodiment 58. The method of embodiment 57, further comprising disposing a release layer between the powder material and the sealant layer, wherein the release layer comprises the first material.

Embodiment 59. The method of embodiment 57, further comprising applying a heat or pressure to the powder material to form the body.

Embodiment 60. A method of forming a material having a body, comprising:
  disposing a powder material in an apparatus;
  disposing a first barrier layer along a side of the powder material, wherein the first barrier layer comprises a metal element;
  disposing a release layer such that the release layer is between the barrier layer and the side of the powder material,
  wherein the release layer comprises the first material; and
  applying a heat or a pressure to the powder.

Embodiment 61. The method of embodiment 60, further comprising a sealant layer over the powder material, wherein the sealant material comprises the first material.

Embodiment 62. The method of any of embodiments 57 to 59 and 61, wherein the sealant layer has a thickness at least 3 mm and at 10 mm.

Embodiment 63. The method embodiment 60, wherein the release layer extends over an entire thickness of the compacted powder material.

Embodiment 64. The method of embodiment 57 to 60, wherein the first material comprises a nitride.

Embodiment 65. The method of embodiment 61, further comprising disposing a second barrier layer between the bottom surface of the first plunger and the sealant layer.

Embodiment 66. The method of embodiment 61, wherein the first barrier layer is disposed such that the first barrier layer extends over a length of the release layer and over a thickness of the sealant layer.

Embodiment 67. The method of embodiment 60, wherein the first barrier layer comprises a foil.

Embodiment 68. The method of embodiment 55 or 60, wherein the powder material comprises $B_6O_X$, wherein x is at least 0.9 and at most 1.1.

Embodiment 69. The method of embodiment 55 or 60, wherein the body comprises $B_6O_X$, wherein X is at least 0.9 and at most 1.1.

Embodiment 70. The method of embodiment 69, wherein the body comprises at least 90 vol % or at least 91 vol % or at least 92 vol % or at least 92 vol % or at least 93 vol % or at least 94 vol % or at least 95 vol % or at least 96 vol % or at least 97 vol % or at least 98 vol % or at least 99 vol % for a total volume of the body.

Embodiment 71. An apparatus, comprising:
  a first plunger having a bottom surface;
  a spacer disposed at the bottom surface of the first plunger; and
  a barrier layer extending over a side surface and a bottom surface of the spacer.

Embodiment 72. The apparatus of embodiment 71, further comprising a sealant layer underlying the barrier layer, wherein the sealant layer comprises a different material than the barrier layer.

Embodiment 73. The apparatus of embodiment 71, wherein the barrier layer comprises a metal element.

Embodiment 74. The apparatus of embodiment 71, further comprising a mold, wherein the barrier layer is disposed along an inner surface of the mold.

Embodiment 75. The apparatus of embodiment 71, further comprising a second plunger coaxially aligned with the first plunger.

Embodiment 76. The apparatus of embodiment 75, further comprising second spacer disposed at an upper surface of the second plunger, wherein the barrier layer extends over a side surface and an upper surface of the second spacer.

Embodiment 77. The apparatus of embodiment 71, wherein the apparatus comprises a hot press.

EXAMPLES

Example 1

A representative sample S was formed in accordance with embodiments disclosed herein. Briefly, amorphous boron powder and crystalline boric anhydride ($B_2O_3$) powder was mixed at the ratio 2.48 of boron to $B_2O_3$ (by mass). Prior to mixing, $B_2O_3$ was ball milled down to a particle size less than 125 um. The powders were mixed utilizing an acoustic mixer with the vibration intensity set to 80 g's and the vibration time to one minute. The cycles were repeated for four times. The blended powder was put in a graphite furnace and sintering was performed in the atmosphere of argon. The temperature of the furnace was first set at 600° C. and ramped up at 4° C./min from the room temperature. The mixture was heated at 600° C. for 30 minutes, and then the temperature of the furnace was further increased to 1400° C. at 10° C./min. The mixture was further heated at 1400° C. for 60 minutes and then allowed to cool down until the furnace returned to the room temperature. The $B_6O_X$ powder was formed. It was then removed from the crucible, milled and sieved to obtain an average particle size not greater than 1 micron.

Then the mold was set up as illustrated in FIG. 2 and disclosed in embodiments herein. A tantalum foil was used as the barrier film. 50 g boron nitride was used to form each sealant layer. Boron nitride release tapes were disposed to separate the sealant layers from the $B_6O_X$ powder layer. Boron nitride release paint was applied to the tantalum foil to separate the tantalum foil from the $B_6O_X$ powder layer. The plunger and spacer had a diameter of 4 inches. Hot pressing was conducted utilizing the parameters included in Table 1 to form sample S.

TABLE 1

| Type | Temperature | Time | Atmosphere | Load (lbs) |
| --- | --- | --- | --- | --- |
| Ramp | Room T to 600° C. | 4° C./min | Vacuum | 2300 |
| Hold | 600° C. | 30 minutes | Vacuum | 2300 |
| Ramp | 600° C. to 1200° C. | 10° C./min | Vacuum | 2300 |
| | Switch Gas to Argon | | | |
| Ramp | 1200 to 2000° C. | 4° C./min | Argon | 41500 |
| Hold | 2000° C. | 30 minutes | Argon | 41500 |
| Ramp | 2000° C. to Room T | 10° C./min | Argon | Remove Pressure |

Another sample, C1, was formed in the same manner as disclosed above to form sample S, except that the mixture of boron and $B_2O_3$ powders was placed in the mold (replacing the $B_6O_X$ powder layer illustrated in FIG. 2 with the mixture) to directly form the sample from the raw materials and hot pressing was performed using the parameters in Table 2. Sample C2 was formed in the same manner as disclosed above to form sample S, except that hot pressing was performed using the parameters included in Table 3. Lattice constants a and c, Xa, Xc, and X of the samples are included in Table 4 below.

TABLE 2

| Type | Temperature | Time | Atmosphere | Load (lbs) |
| --- | --- | --- | --- | --- |
| Ramp | Room T to 100° C. | 15° C./min | Vacuum | 12000 |
| Hold | 100° C. | 20 min | Vacuum | 12000 |
| Ramp | 100° C. to 500° C. | 15° C./min | Vacuum | 12000 |
| | Switch Gas to Argon | | | |
| Hold | 500° C. | 20 min | Argon | 12000 |
| Ramp | 500° C. to 1200° C. | 12.5° C./min | Argon | 12000 |
| Ramp | 1200° C. to 1500° C. | 4° C./min | Argon | 12000 |
| Ramp | 1500° C. to 1800° C. | 8° C./min | Argon | 12000 |
| Hold | 1800° C. | 5 min | Argon | 41500 |
| Ramp | 1800° C. to 2030° C. | 8° C./min | Argon | 41500 |
| Hold | 2030° C. | 20 min | Argon | 41500 |
| Ramp | 2030° C. to 1700° C. | 50° C./min | Argon | 24000 |
| Ramp | 1700° C. to 20° C. | 50° C./min | Argon | 24000 |

TABLE 3

| Type | Temperature | Time | Atmosphere | Load (lbs) |
| --- | --- | --- | --- | --- |
| Ramp | Room T to 100° C. | 20° C./min | Vacuum | 2300 |
| Hold | 100° C. | 20 min | Vacuum | 2300 |
| Ramp | 100° C. to 1000° C. | 20° C./min | Vacuum | 2300 |
| | Switch Gas to Argon | | | |
| Hold | 1000° C. | 5 min | Argon | 14000 |
| Ramp | 1000° C. to 1900° C. | 12.5° C./min | Argon | 41500 |
| Hold | 1900° C. | 5 min | Argon | 41500 |
| Ramp | 1900° C. to 2030° C. | 8° C./min | Argon | 41500 |
| Hold | 2030° C. | 15 min | Argon | 41500 |
| Ramp | 2030° C. to 1000° C. | 50° C./min | Argon | 41500 |
| Ramp | 1000° C. to 20° C. | 50° C./min | Argon | Remove pressure |

TABLE 4

| Sample | A (angstroms) | C (angstroms) | Xa | Xc | X [(Xa + Xc)/2] |
| --- | --- | --- | --- | --- | --- |
| S | 5.401 | 12.307 | 1.020 | 0.992 | 1.006 |
| C1 | 5.382 | 12.323 | 0874 | 0.836 | 0.855 |
| C2 | 5.384 | 12.324 | 0.894 | 0.824 | 0.859 |

Example 2

Additional representative samples S2 and S3 were formed in the same manner as described above with respect to sample S. $V_{50}$ ballistic limit was tested on samples S2 and S3 and Hexoloy® SA SiC samples C2 to C5 (commercially available from Saint-Gobain Performance Ceramics & Refractories) using projectile P80 and AP8 as described in embodiments of this disclosure. Test results and properties of the samples are included in Table 5 below.

TABLE 5

| Samples | Projectile | Thickness (mm) | Average Density g/cm³ | Areal Density kg/m² | $V_{50}$ ballistic limit m/s |
| --- | --- | --- | --- | --- | --- |
| C2 | P80 | 7 | 3.15 | 22.05 | 779 |
| C3 | P80 | 6.7 | 3.15 | 21.105 | 752 |
| S2 | P80 | 8.6 | 2.56 | 22.016 | 755 |
| S3 | AP8 | 8.6 | 2.56 | 22.016 | 765 |
| C4 | AP8 | 7.1 | 3.15 | 22.365 | 765 |
| C5 | AP8 | 7.0 | 3.15 | 22.05 | 744 |

Example 3

Additional representative samples S4, S5, and S6 were formed in the same manner as sample S1, except hot pressing was performed using the parameters included in Table 2. Knoop hardness at 100 g was tested. An average of 5 tests for each sample is included in Table 6.

TABLE 6

| Samples | Average Knoop Hardness at 100 g GPa | Standard Deviation |
| --- | --- | --- |
| S4 | 31.322 | 1.3091 |
| S5 | 32.4061 | 0.6233 |
| S6 | 32.9817 | 1.7348 |

The foregoing embodiments are directed to a material made of boron suboxide, and particularly boron suboxide with improved stoichiometry and purity, which represent a departure from the state-of-the-art. Those of skill in the art recognize that it is difficult to form stoichiometric boron suboxide, as the raw materials, boron and boron oxide, are highly reactive under temperatures suitable for performing hot pressing.

While some publications have remarked that $B_6O_X$ specimens can be made to be near stoichiometry, the specimens disclosed in those publications were analyzed using weight contents of boron and oxygen in the specimen, which is believed by the skilled artisan to be not as accurate as measurements based on crystalline structure parameters, such as lattice constant a and c. Table 7 below includes values of lattice constants a and c, Xa, Xc, and X determined by lattice constants a and c provided by some prior art references. Table 8 includes weight contents used by the prior art references to determine stoichiometry and the "X" values generated therefrom (referred to as X' hereinafter).

TABLE 7

| Source of Sample | A (angstroms) | C (angstroms) | Xa | Xc | X [(Xa + Xc)/2] |
| --- | --- | --- | --- | --- | --- |
| Rizzo * | 5.395 | 12.342 | 0.972 | 0.653 | 0.813 |
| Petrack ** | 5.386 | 12.326 | 0.905 | 0.806 | 0.855 |

* Rizzo, H. F., et al., "The Existence and Formation of the Solid B6O", Journal of the Electrochemical Society, Vol. 109, No. 11, 1079-1082 (November 1962).
** Petrack, D. R., et. al., "Preparation and Characterization of Boron Suboxide", National Bureau of Standards Special Publication 364, Solid State Chemistry, Proceedings of 5th Materials Research Symposium, July, 1972.

TABLE 8

| Source of Sample | B (wt %) | O (wt %) | B (mol %) | O (mol %) | X' (mol % of B to mol % of O) |
|---|---|---|---|---|---|
| Rizzo | 77.85 | 19.90 | 85.28 | 14.72 | 0.966 |
| Petrack | 79.70 | 20.70 | 85.08 | 14.92 | 0.951 |

Discrepancies of the values of X and X' can be observed between Tables 7 and 8. It should be noted when using the weight contents of boron and oxygen to determine X' in a specimen that includes elemental boron and/or oxygen in a phase other than the boron suboxide phase, the contents of boron and oxygen may be skewed, because the phase may not be detected by X-ray, which would cause the boron and/or the oxygen in that phase to be taken into consideration for determining X'. Lattice constants a and c, Xa, and Xc are crystallography features of $B_6O_X$, which are not be affected by the presence of a non-$B_6O_X$ phase having elemental boron or oxygen. When both approaches are used to analyze stoichiometry of a $B_6O_X$ sample, and X and X' values are not consistent, it should be considered that a different phase containing elemental boron and/or oxygen may be present in the sample and analysis based on lattice constants is likely to be accurate.

In this disclosure, stoichiometry of $B_6O_X$ is described based on lattice constants a and c of the $B_6O_X$ phase only and X is the average of Xa and Xc. The material disclosed in embodiments of this disclosure has X in a range from 0.90 to 1, determined based on lattice constants a and c. The forming process noted in this disclosure, such as taking an extra step to form $B_6O_X$ powder prior to the use of a hot press, in combination with the uses of the barrier film, sealant layer, and/or release layers, contributes to formation of the $B_6O_X$ having improved stoichiometry and properties.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A material, having a body comprising $B_6O_X$, wherein:
   X=(Xa+Xc)/2, wherein Xa=(A−5.26)/0.1347, Xc=(C−12.410)/(−0.10435), A represents a value of lattice constant a, and C represents a value of lattice constant c; and
   0.85≤X≤1.2;
   wherein the body comprises a length, a width, and a thickness; and
   wherein the body comprises a content of a compound including an element other than boron and other than oxygen of at most 4 wt % for a total weight of the body.

2. The material of claim 1, wherein the body comprises at least 90 vol % of $B_6O_X$ for a total volume of the body.

3. The material of claim 2, wherein the length is greater than the width and the thickness.

4. The material of claim 1, wherein the body comprises a volume of at least 108 cm$^3$.

5. The material of claim 1, wherein Xc is at least 0.89.

6. The material of claim 1, wherein A is at least 5.396.

7. The material of claim 1, wherein C is at most 12.318.

8. An armor component, comprising a body including the material of claim 1.

9. The material of claim 1, wherein the body has:
   a minimum thickness of 2 mm;
   a width of at least 10.0 cm; or
   a combination thereof.

10. A material, having a body comprising:
    a length, a width, and a thickness; and
    $B_6O_X$, wherein X=(Xa+Xc)/2, wherein Xa=(A−5.26)/0.1347, Xc=(C−12.410)/(−0.10435), and A represents a value of lattice constant a, and wherein 0.85≤X≤1.2, wherein the $B_6O_X$ comprises lattice constant a and lattice constant c, wherein C represents a value of constant c and is at most 12.318,
    wherein the body comprises a content of a compound including an element other than boron and other than oxygen of at most 4 wt % for a total weight of the body.

11. The material of claim 10, wherein the body is essentially free of an intentionally added sintering aid.

12. The material of claim 10, wherein A represents a value of constant a, and wherein A is at least 5.396.

13. The material of claim 10, wherein the body has a percent of theoretical density of at least 90%.

14. The material of claim 10, wherein A represents a value of constant a, and wherein A is at least 5.383.

15. The material of claim 10, wherein the body comprises at most 10 vol % of an amorphous phase for a total volume of the body.

16. The material of claim 15, wherein the amorphous phase is at most 5 vol % for the volume of the body.

17. The material of claim 10, wherein the body comprises a polycrystalline phase in a content of at least 97 vol % for the total volume of the body, wherein the polycrystalline phase comprises $B_6O_X$.

18. The material of claim 10, wherein the thickness is at least 2 mm.

19. The material of claim 10, wherein the length is greater than the thickness.

\* \* \* \* \*

UNITED STATES PATENT AND TRADEMARK OFFICE
CERTIFICATE OF CORRECTION

PATENT NO. : 11,827,567 B2
APPLICATION NO. : 17/351777
DATED : November 28, 2023
INVENTOR(S) : Brian C. LaCourse Page 1 of 1

It is certified that error appears in the above-identified patent and that said Letters Patent is hereby corrected as shown below:

In the Claims

In Column 22, Claim 8, Line 33, please delete "claim 1" and insert --claim 2--

Signed and Sealed this
Sixteenth Day of September, 2025

Coke Morgan Stewart
*Acting Director of the United States Patent and Trademark Office*